3,258,394
DIMETHYL-1-METHYL-2-(METHYLCARBAMOYL) VINYL PHOSPHATE INSECTICIDE AND METHOD OF USE
Walter E. Hall and Donald D. Phillips, Modesto, Calif., assignors to Shell Oil Company, a corporation of Delaware
No Drawing. Filed Mar. 25, 1963, Ser. No. 267,819
4 Claims. (Cl. 167—22)

This invention relates to an organophosphorus compound that has been found to be an effective insecticide, with particularly high activity toward aphids, mites and worms. Further, this compound has been found to be effective as a systemic insecticide—that is, if supplied to the soil in contact with the roots of a plant, or applied on any portion of the plant, the compound penetrates into the plant and is disseminated (translocated) therein without injury to the plant, yet effectively destroys insects which chew upon, or suck juices from, the plant.

The compound of this invention is dimethyl 1-methyl-2-(methylcarbamoyl)vinyl phosphate, of the formula

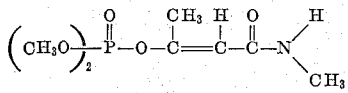

hereinafter designated, for the sake of brevity, as Compound A.

This compound is readily prepared by the reaction of trimethyl phosphite with 2-chloro-N-methylacetoacetamide, the following preparation being illustrative ("parts" means parts by weight unless otherwise designated, and "parts by weight" bears the same relation to parts by volume as does the kilogram to the liter):

EXAMPLE I

A. *Preparation of 2-chloro-N-methylacetoacetamide*

11.5 parts of N-methylacetoacetamide in 100 parts by volume of hexane was heated to reflux and 50 parts by volume of methylene dichloride was added. Temperature: 47° C. 13 parts of sulfuryl chloride (in 50 parts by volume of hexane and 20 parts by volume of methylene dichloride) then was added over a period of 50 minutes, the temperature being maintained at 47° C. The mixture then was refluxed for one hour and the solvents stripped off. The residue was mixed with about 200 parts by volume of methylene dichloride, the mixture washed with saturated sodium bicarbonate solution, then water, and dried. The solvent then was stripped off, and the residue allowed to crystallize to give 2-chloro-N-methylacetoacetamide, melting at 78–80° C.

B. *Preparation of dimethyl 1-methyl-2-(methylcarbamoyl)vinyl phosphate*

33.5 parts of 2-chloro-N-methylacetoacetamide and 3.35 parts of glacial acetic acid was treated with approximately 5 parts by weight of trimethyl phosphite, the temperature originally being at 30° C. and rising to 50° C. Then 28.4 parts of trimethyl phosphite was added over a 15 minute period, with the temperature being held at 65–80° C. The mixture then was stirred for an additional 30 minutes, during which time the temperature was allowed to rise to 103° C. The mixture then was heated at 105–110° C. for 30 minutes, 5 parts of trimethyl phosphite added, the mixture heated at 105–110° C. for an additional 30 minutes, another 5 parts of trimethyl phosphite added and the mixture allowed to stand overnight. It then was heated to 105–110° C. and stripped to 110° C. at 0.02 torr. The residue was stripped on a molecular still, then distilled giving a yellow liquid of boiling point 120–125° C. at 0.003 torr identified by elemental analysis as dimethyl 1-methyl-2-(methylcarbamoyl)vinyl phosphate. The identity of the product was confirmed by infra-red spectrum analysis.

This compound has been found to be an effective insecticide, against a variety of insects typical of various kinds of insects, including flies, aphids, mites, caterpillars (including worms) and mosquitoes. The compound is particularly effective against aphids, mites, and worms.

By the term "insects" is meant not only the members of the class Insecta, but also related or similar invertebrate animal organisms belonging to the allied classes of arthropods and including ticks, mites, spiders, and the like.

The compound of the invention is effective against the immature forms of insects as well as against the mature forms which attack plants. Thus, this compound kills "worms," by which is meant not only the true worms, but also those immature forms of insects—larvae, etc.—which are generally known as "worms," and including larvae of the western spotted cucumber beetle (*Diabrotica undecimpunctata undecimpunctata*), corn earworms (*Heliothis zea*), imported cabbage worms (*Pieris rapae*), Pacific coast wireworms (*Limonium canus*) and the like.

The effectiveness of the compound of this invention as an insecticide is demonstrated by the following experiments and the results thereof.

EXAMPLE II

Solutions of Compound A were made up employing a suitable bland solvent. Tests were carried out using the common housefly (*Musca domestica*) as the test insect, the method being that described by Y. P. Sun, Journal of Economic Entomology, volume 43, pages 45 et seq. (1950). The effectiveness of Compound A was determined as the concentration (percent, weight/volume) of Compound A in the solution required to effect 50% mortality of the houseflies—i.e., the $LC_{50}$ concentration. This concentration was determined to be 0.026%.

EXAMPLE III

Solutions of Compound A were made up employing acetone as the solvent and then diluted with water containing an emulsifier. The solutions were tested for toxicity against the two-spotted spider mite (*Tetranychus telarius*) and the pea aphid (*Macrosiphum pisi*), by spraying groups of plants infested with the insects under controlled conditions which varied from one test to the other only with respect to the concentration of the toxic agent. Thus, in each of the several tests, the same total volume of spray was used. The activity of Compound A with respect to the corn earworm (*Heliothis zea*) was determined by caging corn earworm larvae on cut broad bean plants inserted in water, after formulations of the test compound (prepared by dissolving acetone solutions of the compounds in water) had been sprayed thereon. Two replicates were used with each test, various tests being directed to different concentrations of the test compound in the liquid formulations. In each case, parallel tests were conducted employing a standard insecticide (parathion in the cases of the pea aphid and the two-spotted mite; dieldrin in the case of the corn earworm). The toxicity of Compound A in each instance was compared to that of the standard, its relative toxicity being expressed in terms of the relationship between the amount of Compound A and the amount of the standard insecticide required to produce the same percentage of mortality in the test insects. Assigning the standard insecticide an arbitrary rating of 100, the toxicity of Compound A was expressed in terms of the toxicity index, which compares the toxicity of Compound A on a percentage basis with that of the standard insecticide. That is to say, a test compound having a toxicity index of 50 would be half as active, while one having a toxicity index of 200 would be twice as active, as the standard insecticide. Table I presents the data found.

*Table I*

| Test Compound | Toxicity Index for test insect | | |
|---|---|---|---|
| | Pea aphid | Corn earworm | Two-spotted mite |
| A | 683 | 124 | 1405 |

EXAMPLE IV

The systemic properties of Compound A were demonstrated by the following experiment: the roots of pinto bean plants were immersed for 24 hours in an aqueous solution containing 6 parts per million by weight of Compound A, and then immersed in distilled water. At intervals after removal of the roots from the solution of Compound A, the plants were infested with two-spotted spider mites, and the effect noted. The results are summarized in Table II.

*Table II*

| Test Compound | Percent mortality of mites at indicated days after removal of plant root from solution of Compound A | | | |
|---|---|---|---|---|
| | 0 | 1 | 2 | 7 |
| A | 74 | 84 | 75 | 65 |

This data also demonstrates the long life of Compound A in plants.

The compound of this invention can be employed for insecticidal purposes by the use of any of the methods which are conventionally employed in the art. For example, the compound can either be sprayed or otherwise applied in the form of a solution or dispersion, or it can be absorbed on an inert, finely divided solid and applied as a dust. Useful solutions for application by spraying, brushing, dipping, and the like can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solution, representative materials of this character being fatty acid soaps, rosin salts, saponins, gelatin, casein, long-chain fatty alcohols, alkyl aryl sulfonates, long-chain alkyl sulfonates, phenol-ethylene oxide condensates, $C_{12}$ and $C_{20}$ amines and ammonium salts, and the like. These solutions can be employed as such, or more preferably they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired, the insecticide of the present invention can be employed as an aerosol, as by dispersing the same into the atmosphere by means of a compressed gas.

The concentration of the insecticide to be used with the above carriers is dependent upon many factors, including the carrier employed, the method and conditions of application, and the insect species to be controlled, a proper consideration and resolution of these factors being within the skill of those versed in the insecticide art. In general, however, the insecticide of this invention is effective in a concentration of from about 0.01 to 0.5% based upon the total weight of the composition, though under some circumstances as little as about 0.00001% or as much as 2% or even more (for example, up to 25%) of the compound can be employed with good results from an insecticidal standpoint as wherein high concentrations of active material are used in low-volume sprays or dusts.

When employed as an insecticide, the compound of this invention can be employed either as the sole toxic ingredient of the insecticidal composition, or it can be employed in conjunction with other insecticidally active materials. Representative insecticides of this latter class include the naturally occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl p-nitrophenyl thiophosphate, azobenzene, dimethyl 2,2-dichlorovinyl phosphate, dimethyl, 1,2-dibromo-2,2-dichloroethyl phosphate, and the various compounds of arsenic, lead and/or fluorine.

Compound A may be applied to wet seeds as a concentrate on activated carbon. Methyl cellulose can be employed to aid in the formation of a durable coating on the seed if desired. The seeds are tumbled in the carbon-toxicant mixture until a uniform coating is achieved. The quality of the seed coat is dependent upon the quantity of water used to wet the seed, the quantity of methyl cellulose required, the type and adhesive quality of the carrier employed and the type of equipment used to mix the seed and toxicant. Hence the proportion of diluent and sticker may vary considerably without departing from the scope of the present invention. It should also be understood that the type and quantity of diluent and sticker in the seed dressing may vary very considerably.

We claim as our invention:

1. Dimethyl 1-methyl-2-(methylcarbamoyl)vinyl phosphate.
2. A method for controlling insects which comprises subjecting the insects to the compound of claim 1.
3. An insecticidal composition comprising an inert horticultural carrier and as an insecticide, the compound of claim 1, the concentration of said insecticide being from 0.00001 to about 25% of the total weight of the composition.
4. A method for protecting plants from attack by insects which comprises treating the seeds of the plants to be protected with an effective dosage of the compound of claim 1.

References Cited by the Examiner

UNITED STATES PATENTS 2,802,855   8/1957   Whetstone et al. _____ 260—943

JULIAN S. LEVITT, *Primary Examiner.*

GEORGE A. MENTIS, *Assistant Examiner.*